(12) United States Patent
Banaei

(10) Patent No.: US 9,994,476 B2
(45) Date of Patent: Jun. 12, 2018

(54) METHOD OF THERMALLY DRAWING STRUCTURED SHEETS

(71) Applicant: Everix, Inc., Orlando, FL (US)

(72) Inventor: Esmaeil Banaei, Orlando, FL (US)

(73) Assignee: Everix, Inc., Orlando, FL (US)

( * ) Notice: Subject to any disclaimer, the term of this patent is extended or adjusted under 35 U.S.C. 154(b) by 0 days. days.

(21) Appl. No.: 15/426,448

(22) Filed: Feb. 7, 2017

(65) Prior Publication Data

US 2017/0144915 A1    May 25, 2017

Related U.S. Application Data

(63) Continuation of application No. 14/187,969, filed on Feb. 24, 2014, now Pat. No. 9,597,829.

(Continued)

(51) Int. Cl.
*C03B 23/037* (2006.01)
*B21C 9/00* (2006.01)
(Continued)

(52) U.S. Cl.
CPC .............. *C03B 23/037* (2013.01); *B21C 9/00* (2013.01); *B29C 55/023* (2013.01); *B29C 55/06* (2013.01);
(Continued)

(58) Field of Classification Search
CPC .. B21C 1/003; B21C 1/18; B21C 9/00; B29C 47/0014; B29C 47/0016; B29C 47/0019; B29C 47/78; B29C 47/782; B29C 47/802; B29C 47/807; B29C 55/02; B29C 55/023; B29C 55/04; B29C 55/045; B29C 55/06; B29C 55/08; B29C 55/18; B29C 55/22; B29C 55/24; C03B 23/0006; C03B 23/037; C03B 37/025; C03B 37/0256; C03B 37/026; C03B 37/027; C03B 37/02781; C03B 37/02754; C03B 37/0278;
(Continued)

(56) References Cited

U.S. PATENT DOCUMENTS 4,529,426 A    7/1985 Pleibel et al.
5,183,489 A    2/1993 Brehm et al.
(Continued)

FOREIGN PATENT DOCUMENTS

GB    827488    2/1960

*Primary Examiner* — Peter DungBa Vo
*Assistant Examiner* — Joshua D Anderson
(74) *Attorney, Agent, or Firm* — Brinks Gilson & Lione

(57) ABSTRACT

A method of drawing a material into sheet form includes forming a preform comprising at least one material as a large aspect ratio block wherein a first transverse dimension of the preform is much greater than a second transverse dimension substantially perpendicular to the first transverse dimension. A furnace having substantially linearly opposed heating elements one spaced from the other is provided and the heating elements are energized to apply heat to the preform to create a negative thermal gradient from an exterior surface along the first transverse dimension of the preform inward toward a central plane of the preform. The preform is drawn in such a manner that the material substantially maintains its first transverse dimension and deforms across its second transverse dimension.

10 Claims, 12 Drawing Sheets

Related U.S. Application Data

(60) Provisional application No. 61/914,606, filed on Dec. 11, 2013, provisional application No. 61/914,616, filed on Dec. 11, 2013, provisional application No. 61/768,507, filed on Feb. 24, 2013, provisional application No. 61/768,506, filed on Feb. 24, 2013.

(51) Int. Cl.

| | | |
|---|---|---|
| *B29C 55/02* | (2006.01) | |
| *B29C 55/06* | (2006.01) | |
| *B29D 11/00* | (2006.01) | |
| *C03B 37/026* | (2006.01) | |
| *C03B 37/027* | (2006.01) | |
| *B29L 11/00* | (2006.01) | |
| *B29K 105/00* | (2006.01) | |
| *G02B 6/122* | (2006.01) | |
| *G02B 6/02* | (2006.01) | |

(52) U.S. Cl.
CPC ...... *B29D 11/00634* (2013.01); *C03B 37/026* (2013.01); *C03B 37/027* (2013.01); *C03B 37/02781* (2013.01); *B29K 2105/256* (2013.01); *B29L 2011/0066* (2013.01); *C03B 2203/02* (2013.01); *C03B 2203/04* (2013.01); *C03B 2203/16* (2013.01); *G02B 6/02314* (2013.01); *G02B 6/02385* (2013.01); *G02B 6/1225* (2013.01)

(58) Field of Classification Search
CPC .............. C03B 37/029; C03B 2203/02; C03B 2203/04; C03B 2203/10; C03B 2203/12; C03B 2203/14; C03B 2203/15; C03B 2203/16; B29K 2105/256; B29L 2011/0066; B29L 2011/0075; G02B 6/02314; G02B 6/02385; G02B 6/1225; B29D 11/00634; B29D 11/00663; B29D 11/0073
USPC ............... 72/274, 286, 342.94, 364; 264/164
See application file for complete search history.

(56) References Cited

U.S. PATENT DOCUMENTS

| | | | |
|---|---|---|---|
| 5,748,825 | A | 5/1998 | Rockwell, III |
| 6,259,830 | B1 | 7/2001 | Bhagavatula |
| 6,393,868 | B1 | 5/2002 | Krauss et al. |
| 6,550,279 | B1 | 4/2003 | Anderson et al. |
| 6,650,815 | B2 | 11/2003 | Hawtof et al. |
| 7,082,236 | B1 | 7/2006 | Moore |
| 7,567,742 | B2 | 7/2009 | Pickrell et al. |
| 2005/0000599 | A1 | 1/2005 | Liebermann et al. |
| 2007/0104430 | A1 | 5/2007 | Levesque et al. |
| 2008/0085383 | A1* | 4/2008 | Merrill ............ B29C 55/06 428/29 |
| 2011/0062410 | A1 | 3/2011 | Ivanov et al. |
| 2011/0200805 | A1 | 8/2011 | Tomamoto et al. |
| 2011/0230596 | A1 | 9/2011 | Wilenski et al. |
| 2011/0240551 | A1 | 10/2011 | Ishizuka et al. |
| 2011/0317329 | A1 | 12/2011 | Letz et al. |

* cited by examiner

METHOD OF THERMALLY DRAWING STRUCTURED SHEETS

FIELD OF THE INVENTION

The present disclosure generally relates to apparatuses and methods for the drawing of materials from a preform. More particularly, the present disclosure relates to a method of thermally drawing an elongate sheet from a preform wherein the material is maintained dimensionally constant in a first transverse dimension and reduced in a second transverse dimension.

BACKGROUND OF THE INVENTION

Techniques for heating, and subsequently drawing, glass into fine fibers has been known for millennia. It was, however, during the 1930s when this technique was first introduced into the textile industry. As further explained below, this technique was employed later, during the 19th century, to manufacture glass optical fibers.

Light guidance in transparent pipes and water streams historically inspired the use of optical fibers for light transmission. The light guiding process using the total internal reflection was first demonstrated by Daniel Colladon and Jacques Babinet in Paris during the early 1840s. It found applications such as illumination in dentistry, image transmission and internal medical examination early in the 20th century. Later, during the 1920s, the concept of modern glass fibers with a glass core and a lower index cladding for a more suitable index guiding was introduced. Low-index oils and waxes were mostly used to produce the lower-index cladding. During the 1950s, University of Michigan undergraduate student Lawrence E. Curtis produced the first glass-core fiber having glass cladding for minimizing the interference of guided light with the surrounding environment. Advances in the fiber fabrication process combined with the proper choice of glass materials rendered the optical fibers as feasible tools for long-distance optical telecommunications, as well as many other applications such as sensing and imaging. During the 1990s, micro-structured fibers and photonic crystal fibers were developed wherein the guiding mechanism was based upon light diffraction from periodic structures in the fiber. It was found that photonic crystal fibers could potentially transmit higher light power and would give the possibility of dispersion adjustment based on structure design. In recent years, a new class of fibers (so-called multi-material fibers) emerged based on thermal co-drawing of multiple types of materials all having thermally and mechanically compatible properties. This new class of fibers enabled the introduction of novel functionalities (i.e., not limited to optical light transmission). For example, one novel expanded functionality included fibers with semiconducting glass and metal electrodes integrated into a single fiber for light detection applications. The field of multi-material fibers recently expanded even further to include piezoelectric fibers and multi-material fibers for structured microsphere and nanosphere fabrication.

Throughout the history of fiber development, thermal fiber drawing has been the most popular and the most successful fabrication method. Simplicity and speed of thermal fiber drawing made optical telecommunication an economically viable technology. The circularly symmetric geometry of optical fiber fabrication was indeed inspired by the natural shape of water streams and glass fibers that were produced through heating and pulling of glass.

In the fiber drawing process, softened material has the tendency to round up into fibers having a circular cross-section to minimize the surface free energy under surface tension. However, in the longitudinal direction, the tension along the fiber that is produced by the intentional pulling process, dominates the surface tension and leaves the fiber longitudinally elongated. During the pulling process, material is maintained at or about the softening temperature for a (brief) period of time adequate to stretch it into a fiber. It is then gradually cooled to solidify the stretched form that is called a fiber. This is the fiber fabrication process that has been used for centuries in the textile industry and for decades in the field of optics. In recent years, fibers having non-circular cross-sectional areas have been created by giving an asymmetric geometry to the fiber preform and trying to maintain that geometry by not overly heating the fiber during the drawing process. It is possible to maintain non-circular structures by not giving the material enough freedom (low viscosity) and time to round up to a circular shape. Fibers made using this method—having hexagonal, square, rectangular and even D-shaped cross-sections—have been reported for various applications. With regard to all fibers of different materials for various applications over decades, the circular symmetry of fiber preform heating has allowed for equal scale reduction in both transverse directions (i.e., height and width) across the fiber. This results in maintenance of the aspect ratio of the preform in the final drawn fiber by allowing equal shrinkage in both transverse directions In conventional fiber drawing methods, and as illustrated in FIG. 1, a fiber preform 110 is placed in a tubular (or similar) furnace 140 wherein a heating element 142 surrounds the preform 110 in a manner that provides uniform heating about the preform 110. The furnace begins heating and softening the materials from the outermost layers to the innermost layers of the preform 110. As a result, there is always a relatively large temperature (and hence viscosity) gradient across the fiber preform 110 in the radial direction 'B' (transverse to the longitudinal axis 'A'). The middle of the preform 110 (coinciding with the center of the furnace 140) has the highest viscosity, while the outer layers have relatively lower viscosities. This viscosity gradient acts to force the material to flow toward, and stretch from, the center of the preform 110, where the temperature is lowest and the viscosity is highest. This can be confirmed by dislocating the preform 110 in such a manner that its center no longer coincides with the center of symmetry (or more accurately the coldest point) of the furnace 140. In this case, the material flow and stretching occurs from the location of the lowest furnace temperature that is not at the center of the preform 110. This is commonly referred to as "asymmetric fiber pulling," which is not desired for most fibers. To minimize this problem most fiber draw machines have automatic centering features that align the preform 110 with the center of furnace 140.

If the preform does not have a cylindrical shape, it will still shrink almost uniformly in both transverse directions and will maintain the original shape in a smaller scale, unless temperature is too high and therefore viscosity is too low. In that case, the material has a tendency to minimize its free energy under surface tension. This will deform the fiber's cross-section towards a circular one.

However, the use of a furnace that supplies a uniform thermal gradient about 360 degrees of a preform limits the shapes that can be drawn. Therefore, a method of applying thermal gradients to facilitate cross-sectional shapes not possible with circular heating is needed.

SUMMARY OF THE INVENTION

The present disclosure is generally directed to a method of drawing a material into sheet form. In one embodiment, the method includes forming a preform comprising at least one material as a large aspect ratio block wherein a first transverse dimension of the preform is greater than a second transverse dimension substantially perpendicular to the first transverse dimension. For example, the present invention may be used to produce elliptical fibers from a circular preform, or a rectangular fiber from a square preform. A furnace having substantially linearly opposed heating elements one spaced from the other is provided and the heating elements are energized to apply heat to the preform to create a negative thermal gradient from an exterior surface along the first transverse dimension of the preform inward toward a plane of the preform, in accordance with one embodiment. In one embodiment, the preform is drawn in such a manner that the material may substantially maintains its first transverse dimension and deforms across its second transverse dimension.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE PREFERRED IMPLEMENTATIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
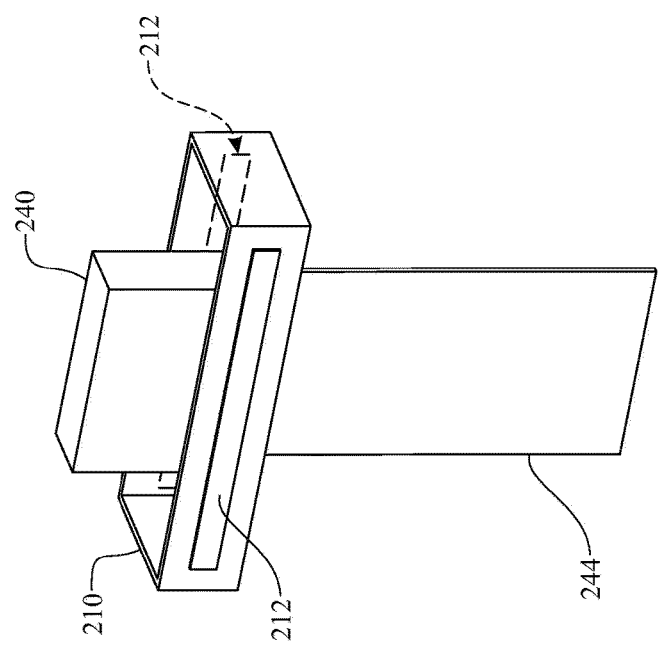
FIG. 2 presents an isometric schematic view of a furnace which supplies a thermal gradient in a linear fashion and embodying the present invention, wherein the thermal gradient is applied to opposing widths of a rectilinear preform for drawing a sheet, in accordance with one embodiment.
Figure 1:
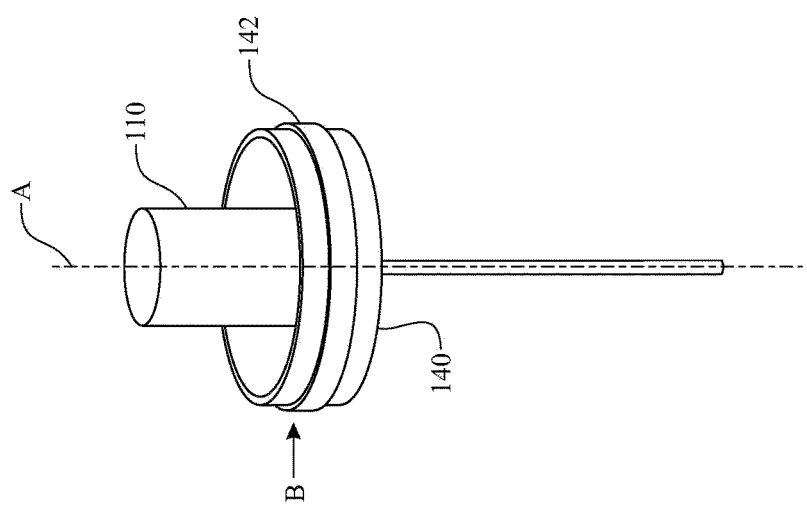
FIG. 1 presents an isometric schematic view of a prior art tubular furnace for heating and drawing a fiber from a cylindrical preform.
Figure 3:
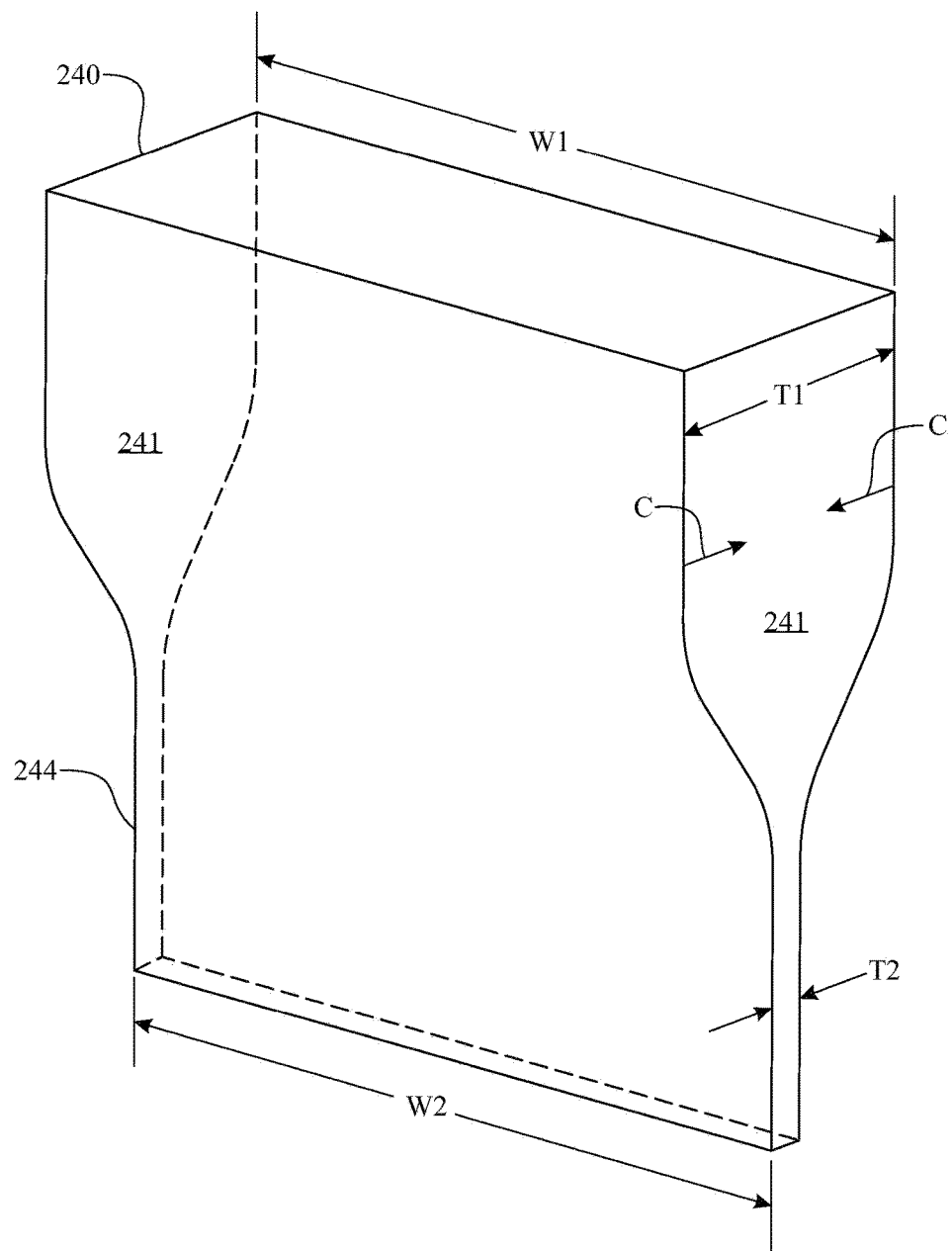
FIG. 3 presents an isometric view of a rectilinear preform illustrating the applied thermal gradient, in accordance with one embodiment.

In one exemplary implementation of the invention, a furnace 210 is shown in FIGS. 2-3 wherein a rectilinear, or large aspect ratio, preform 240 is illustrated being drawn into a longitudinally extending sheet 244. Furnace 210 includes thermal elements 212 extending along a width of the preform 240. The opposed thermal elements 212 produce a thermal gradient configuration according to the opposed gradients "C" as illustrated in FIG. 3.

A geometry of material drawing may be considered as a linear counterpart of conventional fiber drawing. A linear symmetry may be maintained during the drawing process with the preform 240 of large aspect ratio to create a film or sheet 244 as opposed to known circular fibers. The heating geometry is linear as evidenced by thermal elements 212.

Thermal elements may be implemented as a combination of multiple lines of heating elements controlled separately. One embodiment may include three rows of heaters: top, middle and bottom. A person of ordinary skill will recognize that the number of heating elements can be increased or decreased. Multiple heaters may be used to preheat the material before it enters the hottest zone of the furnace and to gradually bring the material to room temperature after it leaves the hottest zone. Pre-heating helps to accelerate the process by preparing the material for faster softening before it enters the hottest zone where actual deformation and drawing takes place. In one embodiment, post-heating to a temperature intermediate between the hottest zone and the ambient temperature takes place to avoid cracks and fractures due to thermal/mechanical shock. Depending on the materials used for the preform, one may need to increase the number of heaters in order to gradually cool the films down before exposing them to the ambient. The dimensions of the preform 240 are such that heat distribution gains a linear symmetry across the preform. Size reduction (shrinkage) of the preform 240 to the sheet 244 in the two transverse dimensions is unequal. The preform 240 begins with a thickness of "t1" and is reduced to "t2" as a result of the opposed thermal gradients "C" applied linearly along the width "w1" of the preform 240. Since the ends 241 of the preform 240 are not subjected to a thermal gradient acting normal to the end surface, the post-drawn width "w2" of sheet 244 is substantially the same as the pre-drawn width "w1" of the preform 240 in such conditions so that little to no shrinkage occurs in one transverse dimension (width) except for small shrinkage at the edges of the preform where linear symmetry is broken and full shrinkage happens in the other transverse direction (thickness). The establishment of a large temperature (and viscosity) gradient across one dimension of the preform 240 utilizing the heating geometry of the invention, limits shrinkage to only one transverse dimension as opposed to conventional fiber drawing where the viscosity has a circular symmetry about the preform with a radially inward directed gradient.

By eliminating a viscosity gradient in one dimension and applying a large viscosity gradient in the other dimension sheets are produced by shrinking a large aspect ratio preform 240 in only one transverse dimension. In the same way as maintaining internal structures in fibers, structures are maintained in thermally drawn sheets made with this method. However, just as the whole preform does not shrink in the second transverse direction, neither does any preform structure shrink in that second transverse direction (edges are the exceptions—structures close to the edges experience some deformation in both directions). In the third (longitudinal) direction, which is the pulling direction, the entire preform 240 is stretched, thereby producing the sheet 244.

In such linear heating schemes, even perfect cylindrical preforms can be drawn to elliptical fiber. Similarly, a preform with square cross-section can be drawn into a rectangular fiber. Such a linear heating scheme will change the aspect ratio of the preform during the drawing process because size reduction is different in two orthogonal transverse directions.

A furnace can have multiple vertical zones in order to control pre-heating, melting, and post-cooling of the preform material. Preform material can be pre-heated with a top heating zone to below the softening point, then heated to the maximum required temperature for drawing, and finally gradually cooled down to room temperature using a bottom heating zone adjusted to an intermediate temperature.

Temperature gradient "C" does not have to be symmetric across the thickness T1 of the slab-like preform. The material will be pulled from the line or point of lowest temperature. If temperature distribution is symmetric across the thickness T1, the film will be pulled from the central line of symmetry of the preform. Otherwise, the line of lowest temperature will fall on one side of line of symmetry of the preform and, therefore, film will be pulled from that location instead. In cases where the thickness of the preform is not considerably large compared to that of the furnace, it will be difficult to create enough temperature gradient between outer surface of the preform (front and rear) and the center line of the preform. It is more practical to create a large temperature gradient from one surface to another instead. Therefore, the film drawing will take place asymmetrically from a line closer to one surface than to the other.

This technique has many advantages that no other existing method provides. Sheets can be made in very large scales. Just like a fiber preform that can produce kilometers of fiber when drawn, the slab-like preform 240 having a large aspect ratio and drawn with this new method can also produce very long lengths of sheets. As long as the heating symmetry is maintained, the process can be utilized to produce very wide sheets. This method can be applied to a wide variety of materials. That is, a wide variety of materials can be used for assembly of preforms and film drawing. Any material that shows a softening temperature, a glass transition temperature or a smooth variation in viscosity as a function of temperature can be implemented in this process. Examples are thermoplastic polymers, all types of glasses, amorphous materials that can be stretched when heated, and metals. In one embodiment, the preforms have elements with matching thermal and mechanical properties. To be more specific, viscosity of elements of a multi-material preform is preferably approximately the same (within some tolerance) at a given temperature used for the film drawing process, this, in order to maintain structural features from the preform to the film with a fixed scaling factor. One can make films with slightly incompatible materials too. But the elements with lower viscosity at the working temperature will flow faster and more easily than others. Thus, those elements will experience different scaling factors.

This process can be conducted at any temperature ranging from −100 C to 3000 C. The processing temperature will vary depending on the materials to be drawn. For example, if structured films of materials with melting temperature below zero are needed, one can conduct the process under cryogenic conditions close to the softening temperature of materials in question. In one embodiment, if structured films with polymers and/or soft glasses are needed, temperatures ranging from room temperature to 600 C can be used. If structured thin sheets of high-temperature materials such as silica glass are needed, higher temperature furnaces can be used to achieve temperature ranges 600 C-3000 C depending on materials.

Possible Structures and Applications

Uniform Materials

The simplest type of sheet can be a sheet with uniform material such as illustrated in FIGS. 2-3. This can be made by starting from the preform 240 made of a uniform material. In one embodiment, this will result in a sheet of uniform material with uniformity of the material maintained in all dimensions of the final film. This simple product can also be made in many other ways. By use of the disclosed process, molecules and elements can be stretched and aligned along the pulling direction. An advantage of making uniform films with this technique is that the quality and consistency of the film surface and thickness is controlled by surface tension that can be easily maintained across the width of the preform and film as opposed to, for example, sheet extrusion where film thickness consistency depends on the consistency of the die slit. This makes it difficult or practically impossible to extrude films thinner than a few micrometers with acceptable thickness consistency. With this disclosed technique even sub-micron films of materials can be drawn consistently, especially if the target thin film material is supported by layers of a secondary material in preform so that the thin film does not break under tension. Supporting secondary material can be a thermally and mechanically matching material that can be co-drawn simultaneously and can be removed from the thin film after drawing.

Layered Sheets

Figure 5:
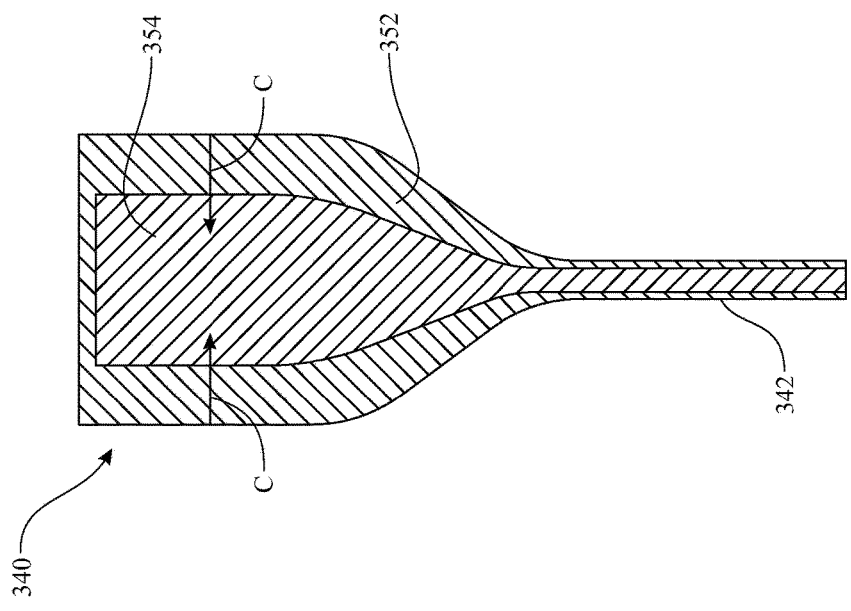
FIG. 5 presents a cross-sectional view of the preform of FIG. 4 during the drawing process, in accordance with one embodiment.
Figure 4:
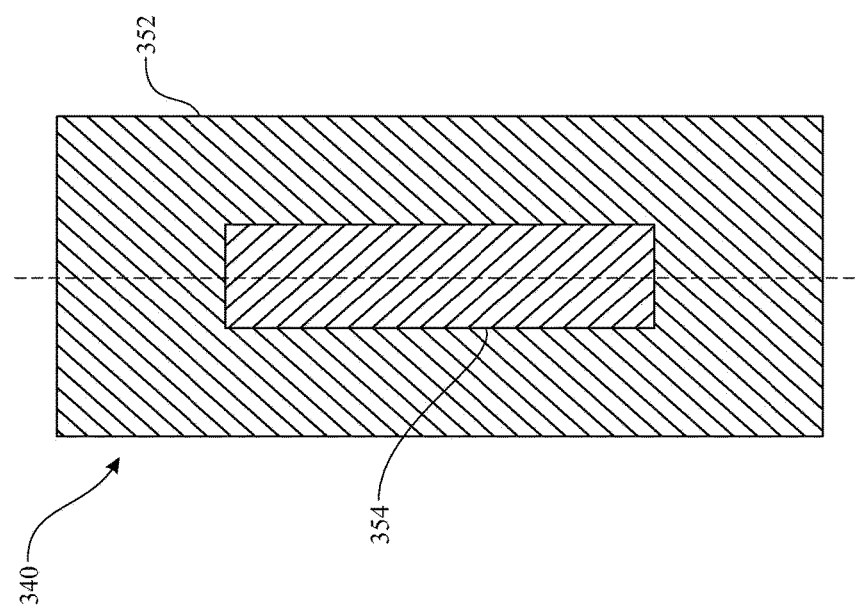
FIG. 4 presents a cross-sectional view of a preform having a single centrally located element of a secondary material, in accordance with one embodiment.

As mentioned above any structure along the pulling direction of the drawn sheets will be stretched from the preform (slab) level to the sheet level. In one embodiment, any structure across the width of the slab-like preform will remain unchanged when viewed normally to the sheet. However, structures across the thickness of the slab-like preform (direction of high temperature gradient) will shrink down multiple times. As shown in FIGS. 4-5, a preform 340 includes a large primary block 352 of a first material has embedded therein a secondary block 354 of a second material. In one embodiment, the preform 340 is transformed via application of the thermal gradient "C" during the drawing process to a thinner sheet 342 having substantially the same width as the preform 340 with a reduced thickness and the thicknesses of the layers of the primary and secondary materials 352, 354 in substantially the same proportion as the pre-drawn thicknesses. It is, however, anticipated that thickness ratios change slightly from the surface of the sheet toward the center plane (or plane of the highest viscosity) in a manner that layers closest to the center plane shrink slightly less than those away from that plane.

Figure 6:
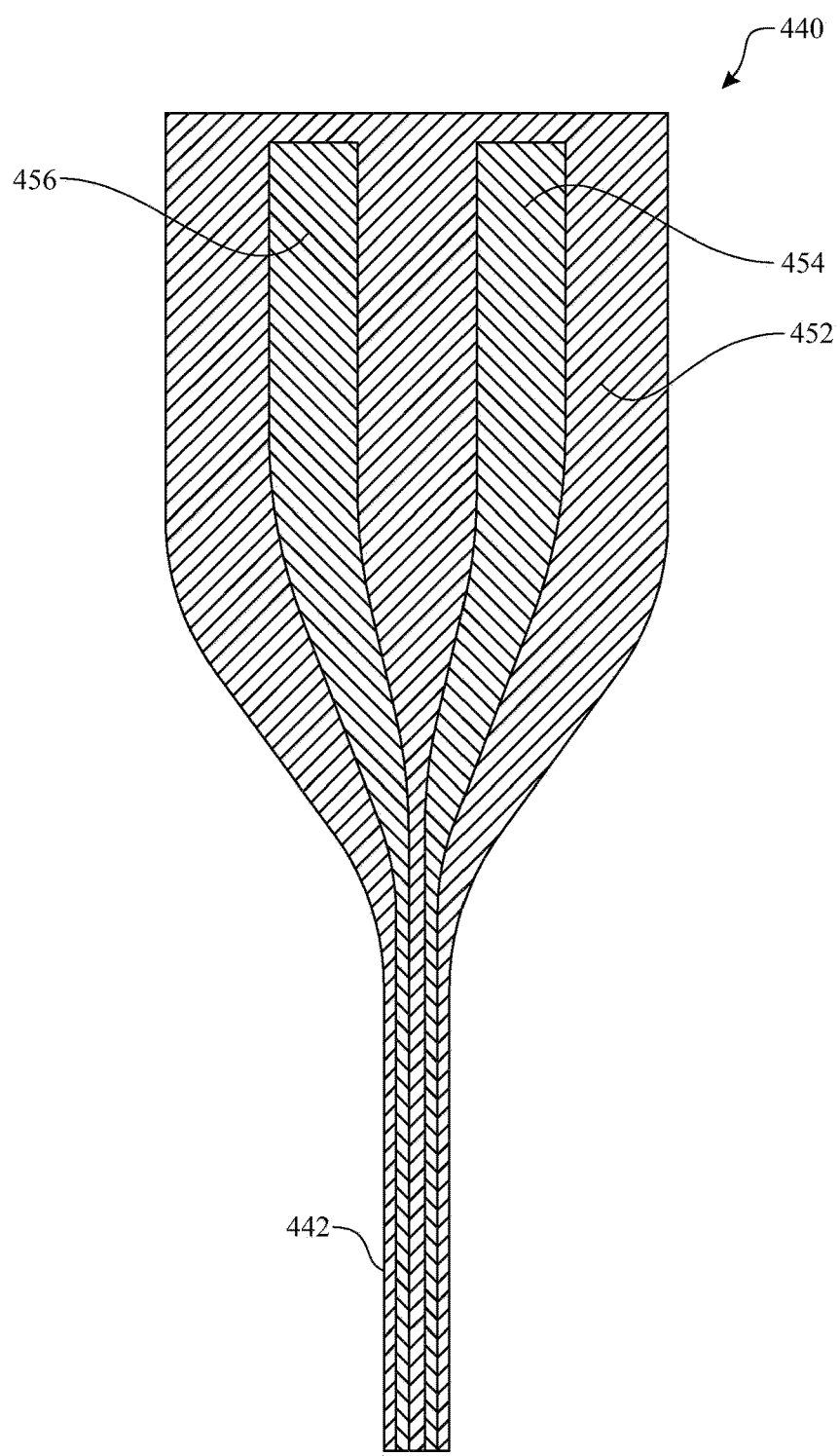
FIG. 6 presents a cross-sectional view of a multi-layered preform being drawn down to a sheet having multiple thin layers, in accordance with one embodiment.

Similarly, as shown in FIG. 6, a preform 440 having parallel layers of different materials 452, 454, 456 or even identical materials with different dopants may be drawn down to a relatively thin multi-layered sheet 442 and create novel devices.

Examples of such layered devices are listed below. However, this material processing method, while inclusive of, is not limited to the following examples.

Bragg's Reflectors and Anti-Reflective (AR) Films—Large Scale

Interference-based thin films for selective reflection and selective transmission of waves (electromagnetic and/or acoustic) can be created with this method. It has long been known that single layers or multi-layer stacks of optical materials with proper refractive indices can create anti-reflective coating for numerous applications where reflection is not desired and needs be minimized. On the other hand, thicknesses and refractive indices of the layers can be adjusted to maximize interferometric reflection. Optical Bragg reflection may be defined as a reflection from a periodic stack of materials with different refractive indices. It was shown in late 1970s that under certain circumstances including high refractive index contrast, omni-directional Bragg reflection could occur. Later, omni-directional reflection was experimentally demonstrated on flat substrates with alternative high-index, low-index glass depositions. All these devices are made using direct deposition of thin films of optical materials. Therefore, the fabrication process is relatively slow, expensive and limited to small areas. Although deposition technologies have been developed and improved for reflective and AR coating for large-area devices such as displays, the omnidirectional and Bragg reflectors have never been demonstrated in large areas.

The thermal sheet drawing process described herein permits a variety of layered structures either for reflection enhancement or for its elimination. Layers of different materials can be stacked in a large-scale slab-like preform and be drawn down uniformly to the thin film form. This technique makes it possible to create AR or Bragg reflectors in very large areas at very low cost. In addition, since this fabrication method is based on a top-down approach starting from large-scale slab preforms, it is less sensitive to layer thickness errors. In other words, compared to depositing microscopic layers with high accuracy, it is much simpler to fabricate macroscopic layers and draw them down to microscopic dimensions with adjusted drawdown ratio by use of the present invention. Another advantage is that one slab preform can give AR or Bragg reflector films for any desired wavelength range just by adjusting the drawdown ratio that can also be changed during one single draw through adjustment of drawing parameters such as film pulling speed and tension, preform down-feed speed, and temperature.

Acoustic Interference-Based Reflector and Anti-Reflection Film

Periodic structures of high elasticity contrast (Phononic Crystals) have been studied theoretically and experimentally in the past decade. It has been theoretically demonstrated that one-dimensional periodic structures of high elasticity contrast materials can create omni-directional and wide-angle sound reflection for frequency ranges that depend on the size of the alternating material layers. In a similar fashion to the optical AR and Bragg reflectors, the acoustic reflection and anti-reflection sheets can be made for either sound transmission improvement or sound transmission blocking in flat and/or flexible films. This can happen by satisfying the conditions for either constructive or destructive interference between the acoustic waves reflected off or transmitted through periodic layers. The present thermal sheet drawing method can be employed in the same way explained above for the optical AR and Bragg reflectors to make acoustic reflection and anti-reflection possible in large-area thin sheets. Such structures can be made using thermoplastic polymers and low-temperature glasses (such as Chalcogenide glasses, Chalcohalide glasses and other similar compositions) having very different elastic constants over a wide range. This technique in conjunction with another technique (hybrid drawing of incompatible materials, disclosed in U.S. Prov. Pat. App. No. 61/768,507) permits alternating layers of metals and polymers or glasses to utilize the low elasticity of metal layers in high contrast with the high elasticity of polymers.

Chirped Layered Structures

This technique permits the fabrication of chirped structures of any arbitrary chirping profile for both optical and acoustic applications. The only difference being the fabrication of the slab-like preform includes the scaled-up version of the desired structure to fulfill either optical or acoustic function as desired and designed.

Sheets with Complex Refractive Index Profiles Such as Rugate Filter

This technique can be used for fabrication of sheets with arbitrary complex refractive index profiles such as Rugate filters in the depth of the sheet. Multiple materials or multiple variations of the same material (doped or un-doped by guest dopants) can be arranged and stacked with various thicknesses in macroscopic level to create arbitrary index fluctuations across the thickness of the preform. In one embodiment, the drawn sheet will therefore replicate the same index variation as a function of position in the depth of the drawn sheets, but in a much smaller scale.

Refractive index and other properties of layers for such complex (gradient-index) structures for optical and/or acoustic applications described above can be fine-tuned in several ways. The term "refractive index" may refer to a complex refractive index (with real and imaginary components) which is a combination of absorption and real refractive index. Addition of micro- or nano-scale particles of very low or very high refractive index glasses or crystals (such as $TiO_2$) with various concentrations may be used to adjust the effective refractive index of materials such as polymers. Another method is additions of inorganic nano-scale semiconducting particles (quantum dots) whose refractive indices are usually much higher than that of typical polymers. Quantum dots can be mixed uniformly with polymers since organic compounds are usually attached to the particles for better solubility in chemical solvents. Addition of any such dopants (guests) may change the absorption and refractive index of the host polymeric material at different portions of the light spectrum. Such films can be used as wavelength-selective window films, light filters, etc., with customizable reflection, transmission and absorption spectra.

Capacitors or Dielectric Barriers—Large Scale

Large-scale capacitors can be made by adding conductive layers separated by dielectric materials to the preform. Such capacitors or devices with dielectric barrier layers can alternatively be made through lamination of thermally drawn films on conductors. Another alternative is to coat conductors (anodes and cathodes) on thermally drawn films with high thickness consistency. Conventional methods have difficulties with maintaining uniform thickness of the dielectric material across large areas. Thin films a few microns thick are usually made by conventional film extrusion methods and are sandwiched between the conductive metal films. The thickness consistency of film extrusion for such thin films of only few microns is usually very poor. Therefore, only relatively small width films can be extruded and used successfully for this application. Utilizing the current drawing process the thickness is controlled by the drawing process parameters such as temperature and speed. This allows a much higher level of control and consistency.

To go one step further, the capacitors may be produced with the electrodes and dielectrics all during a single draw process. Conductive materials that are compatible with the drawing process can be used. Metal conductive thin films of high conductivities can also be non-thermally fed into the thermal drawing process according to the hybrid drawing of incompatible materials disclosed separately.

A Display Application

Slab preform and therefore drawn sheets may include separate or mixed layers with three types of luminescent materials mixed in them. Luminescent materials can be selected to emit Red, Green and Blue (RGB) colors. Luminescent materials can be organic dyes, quantum dots, organic/inorganic compounds, inorganic micro- or nano-particles such as micro-crystals with phosphors. Each of the three luminescent materials can be addressed (excited) with a distinct wavelength of light. Then, each point on such a drawn sheet can be addressed simultaneously by incident beams of light (i.e., laser beams) with adjusted relative intensities to generate desired amounts of red, green and blue for arbitrary color generation. This can create a large-scale, flexible display that can be addressed with existing fast-switched laser beam steering systems with three lasers to create images on the display sheet. For this application rare-earth and phosphor doped micro-crystals are ideal because the low-intensity ambient light cannot excite them. Only higher-intensity laser beams can excite their emission. This can be used as large-scale flexible outdoor/indoor displays with very high contrast and visibility.

Patterned Sheets Made with Post-Processing of Drawn Sheets

With the disclosed process large-scale, flexible sheets can be thermally drawn with either uniform or patterned layers of materials that can undergo changes in their properties with post-processing by application of light, electric field, magnetic field, electric current, heat, etc. There are several classes of materials that can experience changes in their properties including (but not limited to) electrical, optical, acoustic, and magnetic when exposed to one or many of the stimuli mentioned above. To name a few examples: phase change chalcogenide glasses that are widely used for writable, re-writable memories; monomers that polymerize under light or heat exposure; organic materials such as azo-benzene dyes that experience photo-induced isomerization, birefringence, dichromatism, photochromatism, etc.; Electro-chromatic materials that show spectral changes in their response to electric current can similarly be integrated. Micro- and nano-particles can be mixed with the matrix material of the preforms so that they are addressed by external stimuli after sheet drawing in order to induce changes in their properties. An example can be metal nano-particles that undergo photo-induced changes. Another example is rare-earth doped micro- or nano-crystals with single-photon or two-photon absorption/emission properties.

Generated patterns can be temporary, permanent, erasable and/or re-writable. They can be used for writing circuits of various types for electrical (i.e. antenna), photonic (i.e. optical waveguide), magnetic, acoustic, or mixed functionality. They can also be used as a way of storing information on thin flexible surfaces either in one single layer or in multiple layers of material in the same sheet. This is similar to the information storage mechanism on CDs and DVDs but in larger sizes and several more layers to increase the data storage capacity.

3D Photonic/Photonic Crystal Structures

As explained above optical and other properties of some materials can be modified by external post-processing. If the initial sheet before the post processes is a multilayer stack with high contrast in their properties, one- or two-dimensional patterns written on the sheets may transform the one-dimensional periodic structures into two- or three-dimensional periodic structure, respectively, in flexible form and large scales. This may be employed for fabrication of the largest photonic crystal structures.

Patterned Preform to Patterned Sheet Direct Pulling

Figure 7:
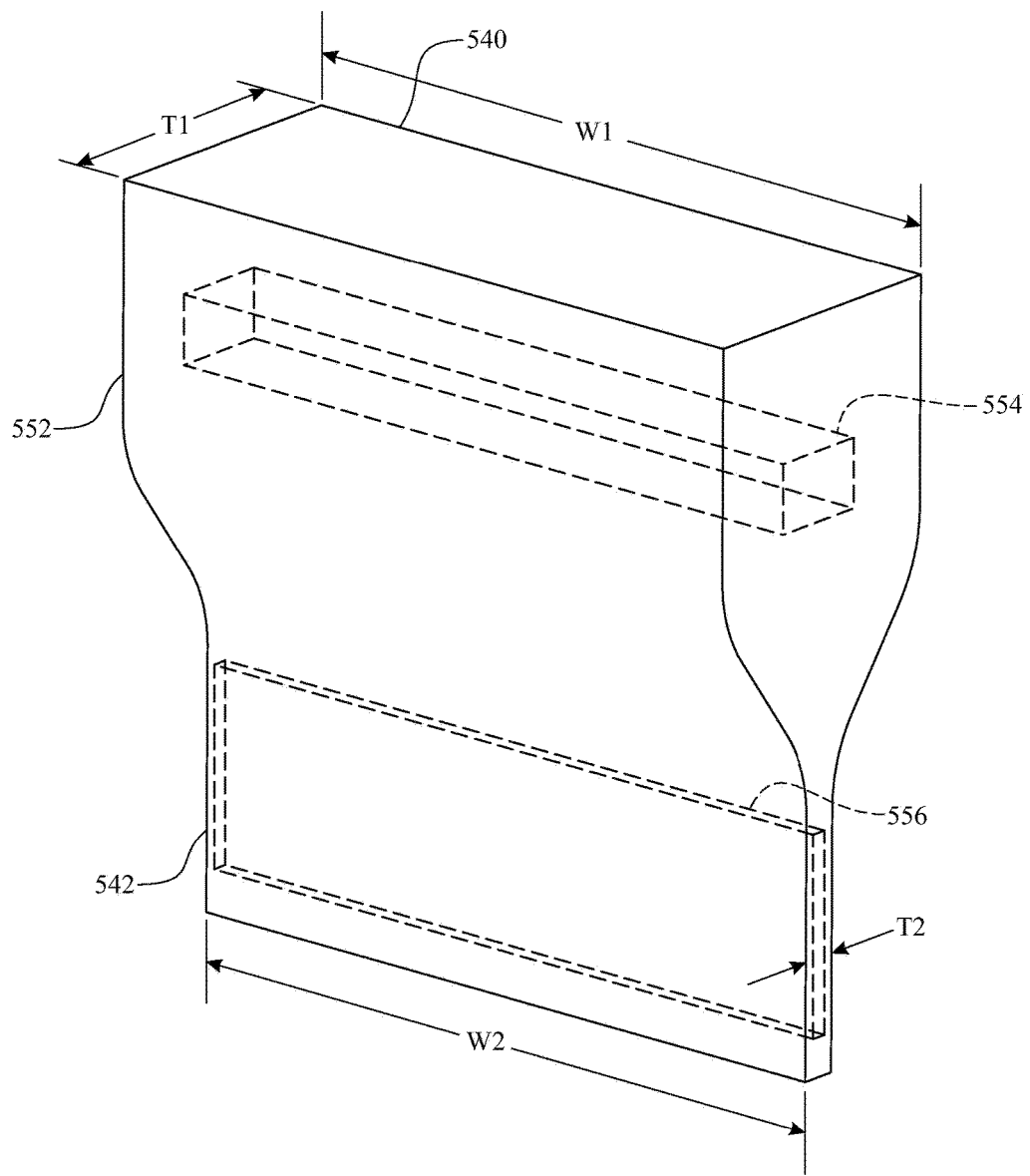
FIG. 7 presents an isometric view of a preform having an embedded patterned insert modified in at least one dimension to facilitate drawing into a desired finished pattern, in accordance with one embodiment.

As discussed above, structures in the preform will shrink in one dimension (across the slab preform thickness), in accordance with one embodiment. They will remain unchanged in the transverse direction across the width of the preform and will be stretched along the drawing direction. Therefore, patterned sheets can be designed and made with the desired patterns incorporated into the preform. In a simplified form and, as shown in FIG. 7, as an exemplary implementation, a patterned sheet 542 can be formed having a finished thickness (t2) with an embedded finished pattern material 556 by, prior to drawing, embedding a desired structure 554 within a primary material 552 of the preform 540 having a larger scale pre-drawn thickness (t1). Those features extending across the width of the sheet (w1, w2) can be made with the same scale in the preform. Finally, stretch in the drawing direction may be compensated by proper design and adjustment of the dimensions in the preform 540. An example of such structure is a sheet with crossed conductive electrodes to generate a two-dimensional mesh grid. This can be used in conjunction with various classes of materials for distinct applications. Light emitting materials can also be used to generate photons by application of electric signals. Another exemplary embodiment is a one-dimensional or two-dimensional phase or amplitude plates (films) made of materials with similar thermal and mechanical properties, but different light transmission or refractive indices. Such phase plates may act as a one- or two-dimensional Fresnel zone plate or lens.

Figure 9:
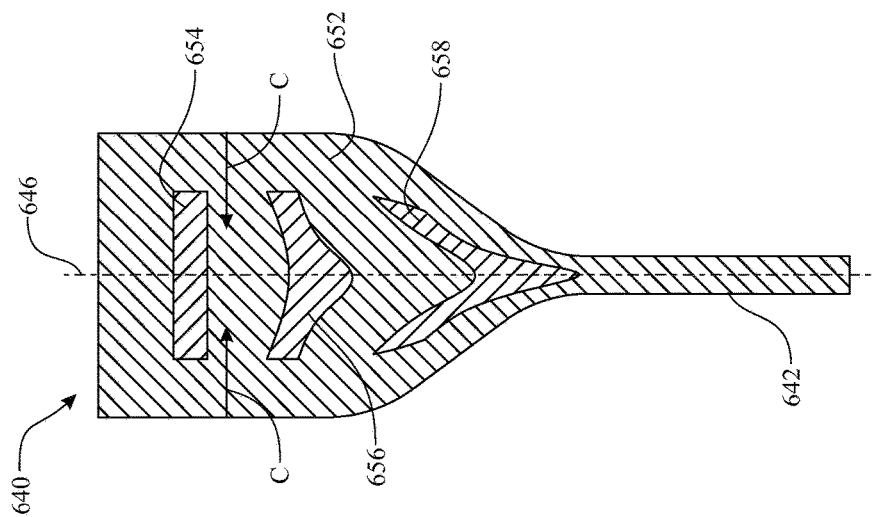
FIG. 9 presents a cross-sectional view of the preform of FIG. 8 during the drawing process, in accordance with one embodiment.
Figure 8:
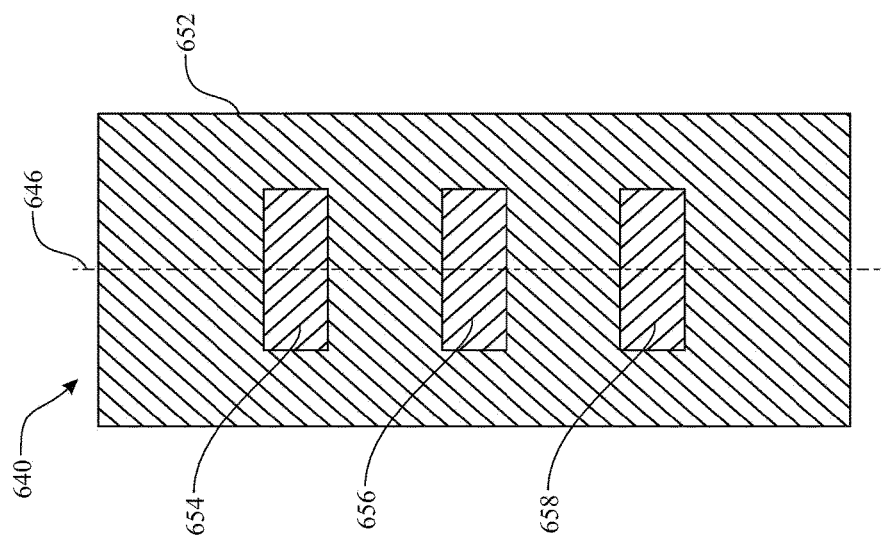
FIG. 8 presents a cross-sectional view of a preform having a plurality of vertically aligned secondary elements within a primary preform block, in accordance with one embodiment.

Another example is shown in FIGS. 8-9 wherein a preform 640 includes a primary material 652 in which is embedded a plurality of vertically aligned secondary material elements 654, 656, 658 and centered on a vertical axis 646 of the preform 640. When the thermal gradient "C" is applied (FIG. 9), the area of lowest viscosity is at the outer boundaries of the primary material 652 and the area of highest viscosity is at the central axis 646. As the sheet 642 is drawn, the secondary element 658 also begins to deform within the preform 640 and deformed by the drawing process to be centrally located within the drawn sheet 642 bounded on each side thereof by primary material 652.

Figures 10, 11:
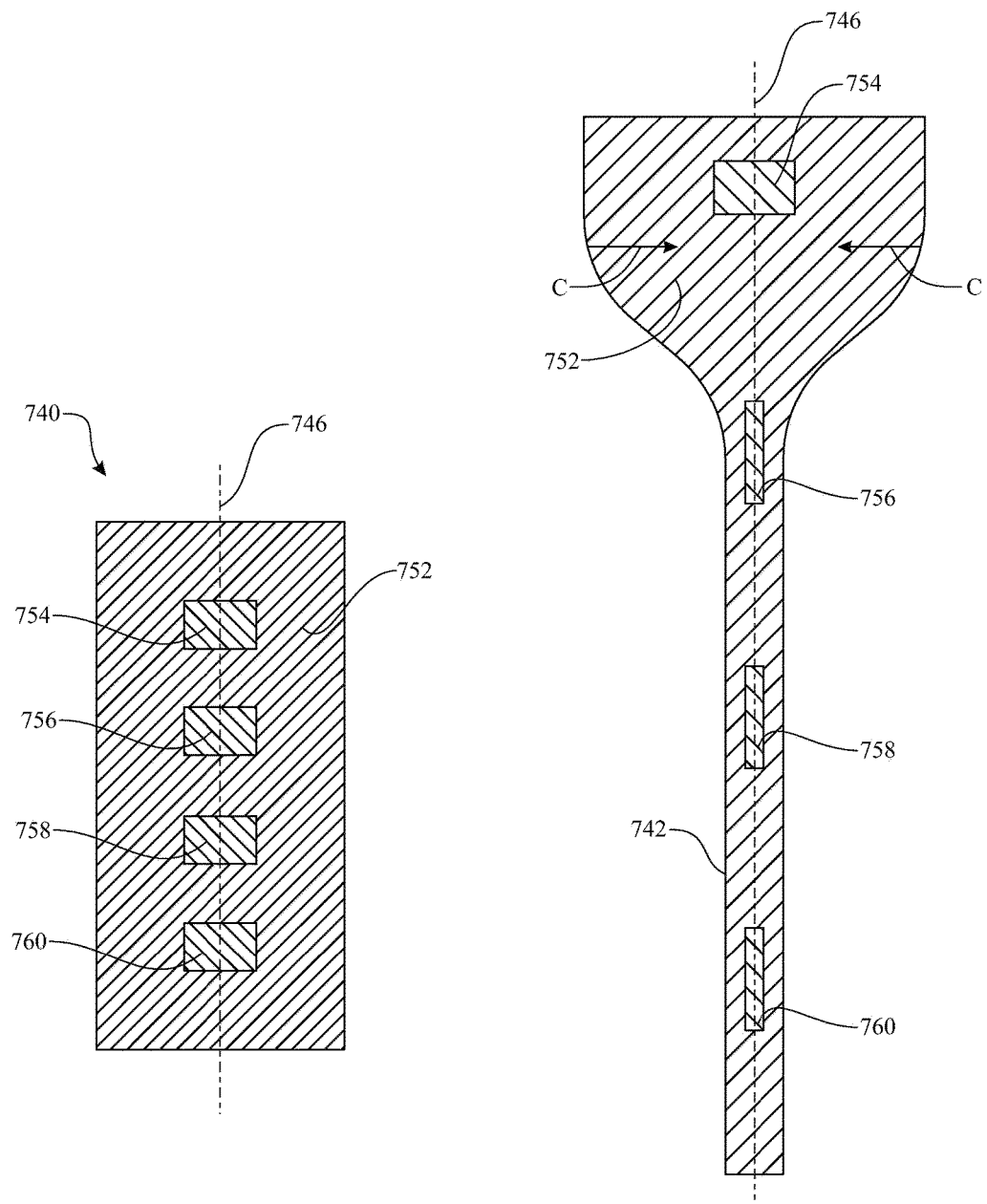
FIG. 10 presents a cross-sectional view of a preform having four vertically-aligned secondary element within a primary preform block, in accordance with one embodiment.
FIG. 11 presents a cross-sectional view of the preform of FIG. 10 during the drawing process and showing the deformed secondary elements in the resultant drawn sheet, in accordance with one embodiment.

A further example is shown in FIGS. 10-11 wherein a preform 740 includes a primary material 752 in which is embedded a plurality of vertically aligned secondary material elements 754, 756, 758, 760 and centered on a vertical axis 746 of the preform 740. When the thermal gradient "C" is applied (FIG. 11), the area of lowest viscosity is at the outer boundaries of the primary material 752 and the area of highest viscosity is at the central axis 746. As the sheet 742 is drawn, the secondary elements 754, 756, 758, 760 also deform along the central axis 746 to elongate within the preform 740. The secondary elements 754, 756, 758, 760 are centrally located within the drawn sheet 742 along axis the 746 and bounded on each side thereof by primary material 752. The deformation mechanics of the primary material 752 and the secondary material elements 754, 756, 758, 760 are known and are provided the pre-drawing configuration of FIG. 7 such that the resultant drawn sheet 742 is produced in its final desired configuration with no further processing required.

Figure 12:
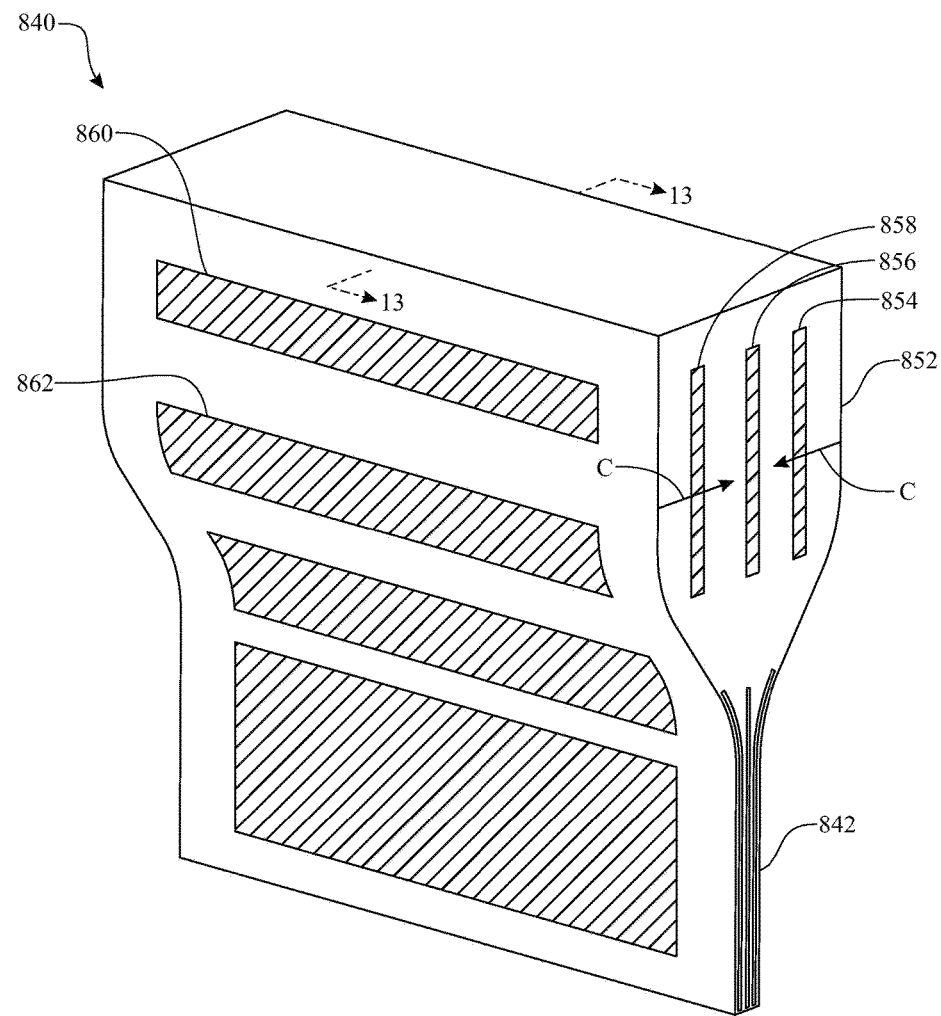
FIG. 12 presents an isometric view of a preform having a plurality of parallel vertical secondary elements and differently shaped outer tertiary elements in the drawing process, in accordance with one embodiment.
Figure 13:
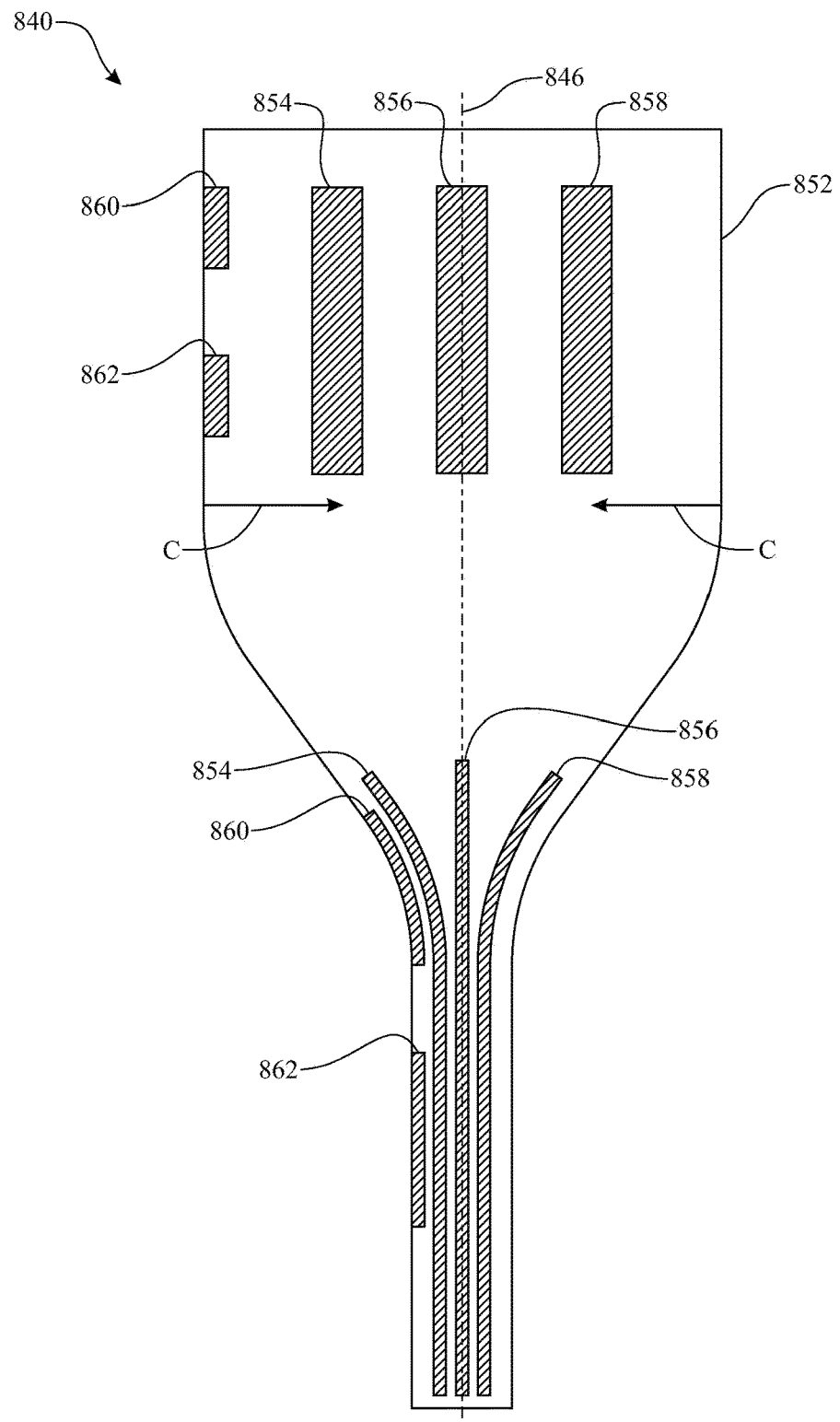
FIG. 13 presents a cross-sectional view of the preform of FIG. 12 during the drawing process illustrating the drawn sheet including the deformed secondary and tertiary elements, in accordance with one embodiment.

Yet another example is illustrated in FIGS. 12-13 wherein a preform 840 includes a primary material 852 in which is embedded a plurality of parallel, aligned secondary material elements 854, 856, 858. The preform can further include tertiary side elements 860, 862 which are of dissimilar configuration than the secondary material elements 854, 856, 858. When the thermal gradient "C" is applied, the area of lowest viscosity is at the outer boundaries of the primary material 852 and the area of highest viscosity is at the central axis 846. As the sheet 842 is drawn, the secondary elements 854, 858 will deform at a lower viscosity than secondary element 856 as a result of the difference in distances along the thermal gradient "C". Tertiary elements 860, 862 also deform at a lower viscosity than the secondary elements 854, 858 as a result of being most proximate to the highest temperature points along the thermal gradient "C". The deformation mechanics of the primary material 852 and the secondary material elements 854, 856, 858, 860 are known and are provided the pre-drawing configuration of FIG. 7 such that the resultant drawn sheet 842 is produced in its final desired configuration with no further processing required.

Single optical waveguides or waveguide arrays can be implemented in films. Preform can include an array of one or more sections with a material with higher refractive index compared to the majority of the preform material. Such sections will be elongated during the sheets drawing process and will form waveguides embedded in sheets. One- or two-dimensional arrangements of such lower index regions can be created in preform so that the final drawn sheet encompasses a one- or two-dimensional array of waveguides along the sheet direction of pulling. Such waveguide arrays may find applications in sensing where fluctuations in the ambient can be sensed over an extended surface covered by such in-film waveguide through interaction of light in waveguides and the ambient. A waveguide array in a flexible sheet/film can also be used for board-to-board interconnection and light signal transport in photonic integrated circuits, especially when tight device packaging required connection of boards using flexible waveguides to save space or when devices are flexible and necessarily demand flexibility of all components.

For the display application mentioned above materials used in Organic Light Emitting Diode (OLED) technology can be used. The disclosed sheet pulling method, however, presents multiple advantages, including: (1) Large-scale displays can be made fairly easily once one preform is made and drawn; (2) Thickness adjustment and accuracy are very critical for OLED applications because thickness of each layer is on the order of few microns or even submicron. With our sheet pulling technique, the thickness of each layer will be many times larger and therefore simpler to fabricate. When the sheet is drawn all layers shrink proportionally and sub-micron thicknesses can be achieved in large areas just by adjusting the sheet drawing parameters that are straight-forward to control; (3) Controlling dust and contamination is much easier in a preform fabrication with a small area compared to the large area of the equivalent drawn sheet. A preform can be carefully prepared under clean and controlled ambient and drawn into sheets of extended area without the concern of contamination of internal thin layers.

Other methods (mostly bottom-up methods) of making devices in flexible form are limited in size to a few inches in each direction. The method disclosed herein can potentially create sheet devices in continuous pieces many times larger than existing versions (if any). This advantage applies to all of the devices listed below, although it will not be mentioned repeatedly throughout the remainder of the description.

Holey Sheets

Similar to the hollow-core and photonic crystal and band-gap fiber drawing, sheets can also be made with hollow capillaries of arbitrary shapes and sizes running along the sheets. Transverse distribution of the holes may depend on applications. Any number of holes can be made in the slab-preform in one- or two-dimensional arrangements. The preform holder can be designed in a way that allows positive or negative gas flow in the holes for controlling expansion or collapse of the holes either independently or collectively. Various gas pressures can be applied to different sections of the slab preform to control holes independently. This may be considered as a linear counterpart of the well-known photonic crystal or bandgap fibers except for the geometry which is changed to linear as in this invention disclosure in accordance with on embodiment. Periodic arrangements of holes surrounding solid or hollow regions of the drawn sheet can result in photonic bandgap creation and confinement of light. This can be used for flexible waveguides and interconnects that are sensitive to bending and mechanical forces.

Structures can be designed and implemented to minimize the dependence of light guiding properties on bending and external stimuli for efficient light transport. Similarly, structures can be designed and realized with high sensitivity to the ambient for sensing.

This method can also be used for reducing the effective refractive index of film by introducing hollow capillaries considerably smaller than light (electromagnetic) wavelength range in question.

Holey Sheets Filled with Materials

Hollow capillaries (as explained above) can then be filled with liquids or gases. They can even be filled liquid materials that solidify after filling and perhaps some processing. Examples of materials: solutions including organic dyes for utilization of their fluorescence or absorption that show different properties in the liquid phase than in the solid phase. Liquid crystals and their mixtures can be used for many applications requiring switchable birefringence.

Holey sheets (either filled or not) can be used for biomedical or chemical sensing applications. Structures, sizes and distances between hollow, solid or liquid-filled channels in a film can be adjusted and designed to enhance the light interaction from some channels with material (specimens and liquid or gas samples) in other channels.

Opto-fluidic experiments and devices can be realized in the form of flexible sheets using this method of capillary production in sheets.

Transversely Elongated Fibers

If the aspect ratio of the preform is not large and the dimensions along the first and the second transverse directions are close the effect of the edges will dominate the effect of one-directional temperature gradient. Therefore, preform shrinks in both transverse directions. Since the sources of heat are only on two sides of the preform, however, shrinkage ratio will be larger in that direction compared to that in the second direction. Therefore, the aspect ratio of the preform will change during the drawing. This way a square preform can be drawn into a rectangular fiber, or a circular preform can be drawn into an elliptical fiber which is otherwise difficult to make especially if elliptical internal features are needed in fiber.

A Method to Avoid Layer (Component) Delamination in Structured Films Composed of More than One Material When the structured sheets (and therefore slab-like preforms) comprise of two or more materials that do not adhere together very well, component may separate or delaminate over time. For example, if the structure has layers of two materials, layers may delaminate and develop air gaps between them. Two methods to avoid this undesired effect are described with reference to FIGS. 14-15.

Figure 14:
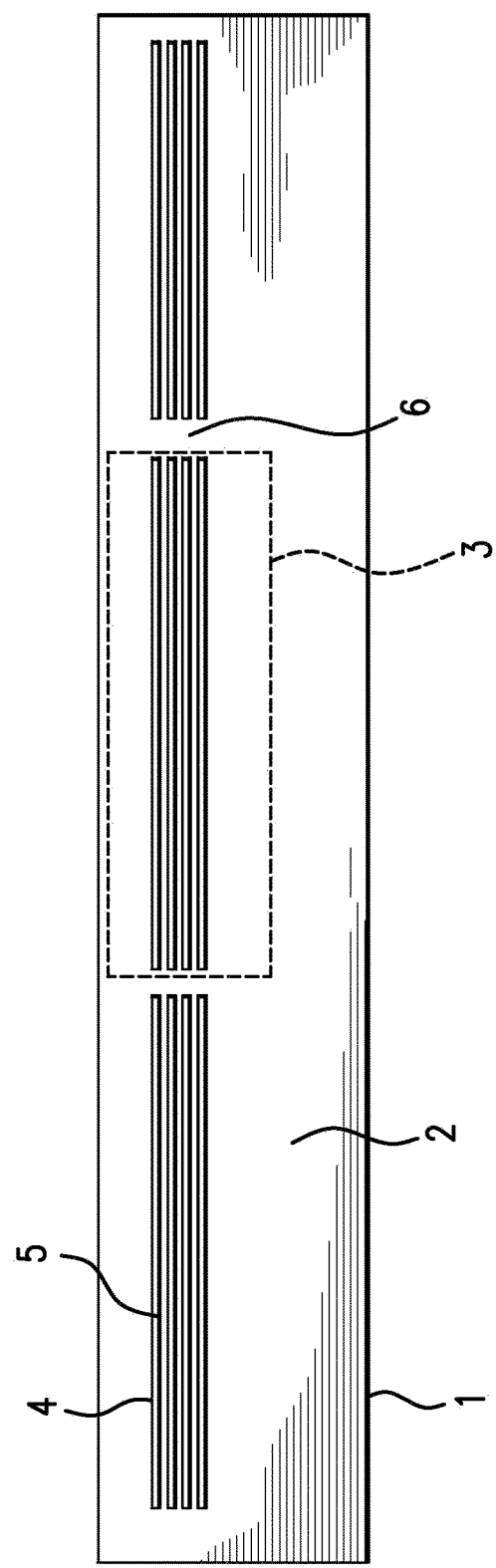
FIG. 14 illustrates one method to avoid delamination and separation of components in a multi-material film in accordance with one embodiment.
Figure 15:
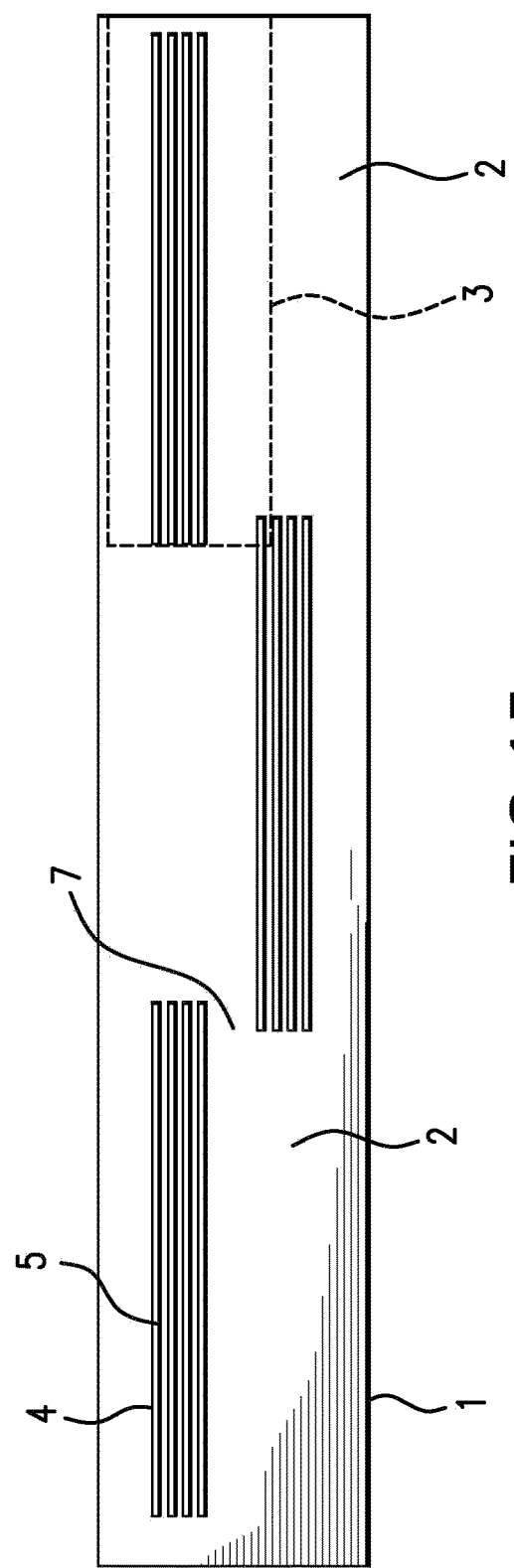
FIG. 15 illustrates one method to avoid delamination and separation of components in a multi-material film in accordance with one embodiment.

When the structured sheets (and slab-like preforms) include two or more materials that do not adhere together very well, components may separate or delaminate over time. FIGS. 14 and 15 demonstrate two alternatives to avoid delamination and separation of components in a multi-material film. The multi-material features (3) of the film (1) can be split into discrete sections of multi-material features (3) to allow continuity of the majority material (2). Discrete multi-material features (3) may be separated by horizontal gaps (6) of the majority material (1). The continuity of the film majority material (2) is intended to maintain the integrity of the film (1). Tension stored in the film during the sheet drawing process is also intended to help maintaining the multi-material components in tight contact and to avoid delamination or separation. Discretization of the multi-material features can be achieved in at least two ways, one with horizontal separation (FIG. 14) and one with vertical separation (FIG. 15). In the former case, horizontal spacing (6) between discrete multi-material features is intended to cause the surrounding majority material (2) to be continuous. Material (2) in the horizontal spacing may act as bridge between two sides of the multi-material features (3) and may force them to remain in tight contact within the features and with the surrounding or outer material (2). In this embodiment, the area of the sheet on the top of bridge areas (6) is optionally not covered by multi-material features (3). Total surface coverage may be beneficial to some applications of such multi-material films. For example, multi-layered films with spectrally selective reflectivity for solar energy applications or for energy efficient window films may benefit from total surface coverage. For such cases, discrete segments of the multi-material features can be arranged in more than one horizontal plane and can be separated by vertical spacing (7), as shown in FIG. 15 instead of horizontal (FIG. 14). Preforms of such films with features separated vertically may be fabricated in another manner.

Figure 16:
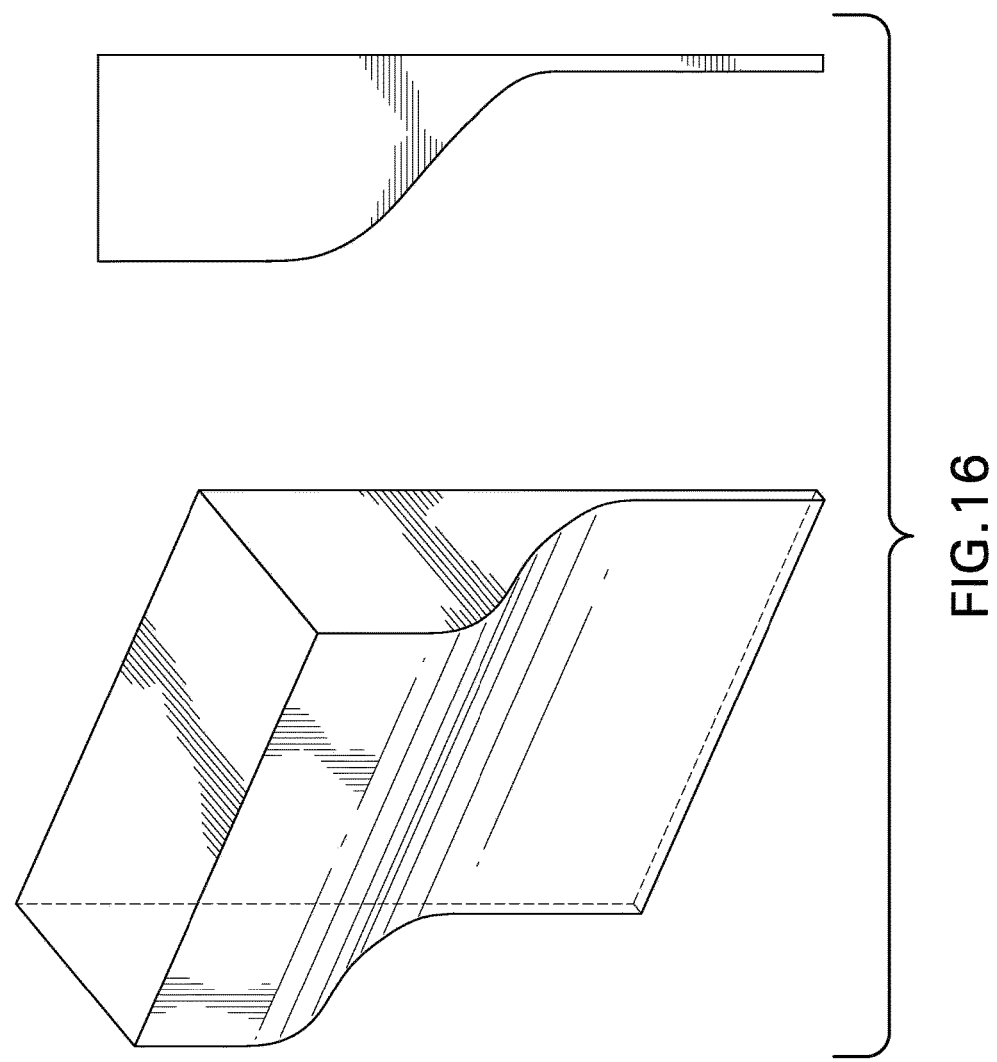
FIG. 16 illustrates a method for asymmetric drawing in accordance with one embodiment.

FIG. 16 shows one embodiment for asymmetric drawing. Temperature gradient "C" does not have to be symmetric across the thickness T1 of the slab-like preform. The material may be pulled from the line or point of lowest temperature. If temperature distribution is symmetric across the thickness T1, the film may be pulled from the central line of symmetry of the preform. Otherwise, the line of lowest temperature may fall on one side of line of symmetry of the preform and film may be pulled from that location instead. In cases where the thickness of the preform is not considerably large compared to that of the furnace, it may be difficult to create enough temperature gradient between the surrounding or outer surface of the preform (front and rear) and the center line of the preform. It is preferable to create a large temperature gradient from one surface to another instead. Thus, in one embodiment the film drawing may take place asymmetrically from a line closer to one surface than to the other.

The plane at which the sheet is drawn is not required to be the central plane of the furnace or preform. Film will start drawing down from the line of lowest temperature and highest viscosity. In asymmetric heating, one side of the slab-like preform is hotter than the other side. Thus, in one embodiment the line of film drawing is closer to the cold side of the furnace than to the hotter side.

In FIG. 16 one surface is heated lightly just to allow material flow while the other is applied more heat to create a large thermal gradient. In this case, film drawing takes place from a line close to one surface of the preform.

In both cases the layered (or the multi-material structured) section of the film is surrounded by a bulk of a uniform jacket material. The main matrix of the material that surrounds internal structures is drawn under tension together with the rest of the film and stores some tension across the thickness of the film (vertical here). This tension may keep the layered (or multi-material components) sections sandwiched under a transverse pressure. It may be beneficial to leave some gaps between layered (or multi-material structured) sections so that the continuity of the surrounding material helps the integrity of the film. In cases where such gaps are not proper for specific applications (for example, when it is necessary that the structured sections cover close to 100% of the film surface area), layered (or multi-material) sections can be placed in different alternating levels (displaced vertically and/or horizontally) so that the discontinuity in layers gives continuity to the uniform surrounding material.

Stack-and-Draw Method for Structured Sheets

Stack and drawing is a known method in structured fiber fabrication. Due to the limits in draw-down factor during a single drawing process, or limits of a custom-design that requires different shrinkage ratios for different elements in a preform, some elements of a fiber are first drawn down to an intermediate size (cane). They are then stacked and assembled into another preform together with other elements; and finally drawn into a final structured fiber. The most common example is the fabrication of photonic crystal fibers. Cylindrical tubes are first drawn down by a few times to create intermediate-size capillaries so called "Canes". Canes are then stacked and placed in a tube and drawn again into fibers. Finally, the capillaries are shrunk in size a few times more than the outer tube, although they are drawn together at the end, because the capillaries have gone through an additional drawing step prior to the final drawing Such stack-and-draw method can be applied to the current invention of sheet drawing. The only difference here is that elements can be drawn down only in one transverse direction in each draw. Since draw-down ratio can be adjusted in each draw, one can define the difference in the aspect ratio change for the two orthogonal transverse directions in the following way.

EXAMPLE 1

Let's assume that one wants to draw a polymer or glass layer from 1 mm thickness to 100 nm. This film can be embedded into a slab-like preform. But it is not practical to drawn a preform down by 1000 times in one draw. So, we can draw this preform once by a factor or F1, embed the drawn film in a second slab-like preform, and draw it down by another factor F2 in a way that F1*F2=1000.

EXAMPLE 2

Let's assume one wants to have a periodic structure in a final film whose direction of periodicity (grating vector, in optics terms) is along the transverse direction (width) W1 of the final film. We want the periodic structure to have alternate layer thicknesses of 1 micrometer and 2 micrometers, and we want the final film to have a total thickness of 0.1 mm. We can assemble a first slab-like preform that includes a multi-layer stack of the two materials with initial thicknesses 100 micro-meters and 200 micro-meters, respectively. We can then draw this preform by 100 times so that bilayers have the target thicknesses of 1 micron and 2 microns. The direction of periodicity, however, is still across the thickness of the first preform/film (T1 or T2). Then we can cut the film along the longitudinal direction in pieces 10 mm wide, rotate (flip) them by 90 degrees and stack them in the direction of preform width (W). We can assemble (or embed) them into a second preform which is now 10 mm thick. This preform can be drawn down by a factor of 100 to give a final film 0.1 mm thick with multi-layers than are shrunk in one direction, but not the other. Therefore, layers in the bilayer system are drawn in one direction in the first draw, and in a second direction during the second draw.

EXAMPLE 3

One can take the following steps to create a layered film with changing layer thickness. Layers of different thicknesses can be stacked in the initial preform before the preform is consolidated and drawn. However, this may not be very practical or efficient when complex layer structures are desired or when layers in the preform level are supposed to be very thin and therefore difficult to handle. For example, discrete rugate structures where each periodic cycle of refractive index variation is formed of several sub-layers each in the range of five to fifty nanometers. Such sub-layers should be sub-micrometer thick in the preform level. A person of ordinary skill would recognize that handling delicate sub-micrometer films (if available in free standing form) is very difficult. In such cases, one can instead obtain the final film through two or more steps of stacking and re-drawing. As another example, if a chirped layered structure is needed with final layer thicknesses ranging between 10 nm and 1 micron with smooth and gradual variations, a single draw with a typical draw-down ratio of 100 will mandate layer thicknesses ranging gradually between 1 micron to 100 microns in the preform level. While 100-micron films are easy to handle and feasible to obtain through currently available film production methods, 1-micron films are not. One can instead start with a preform assembled from layers between 100 microns and 1 mm. This first preform can be drawn at two different draw-down ratios of 10 and 100 corresponding to two different sets of drawing parameters during the same drawing process of the same preform. The first part will give drawn layers in the range 10 microns to 100 microns, while the second part will give layers in the range 1 micron to 10 microns. Pieces from these two parts can then be stacked to form a preform with layer thicknesses covering the entire range 1 micron to 100 microns. This second preform (once drawn by a ratio of 100) yields layer thicknesses in the range 10 nm to 1 micron in a smooth and gradual manner.

EXAMPLE 4

Films with periodic variation in layer properties such as thickness or refractive index can be made the following way. One half of a cycle of the periodic variation can be made through stacking of several layers with properly designed and selected layers into one preform. This first preform can then be drawn into extended length of film with an intermediate thickness. Pieces of this film can be cut, flipped and stacked as many times as needed to create a second preform with several cyclic variations in the properties of layers across the preform thickness. This second preform can then be drawn into a final film with several cycles of layer variation with the final target thicknesses. Alternatively, the first preform can be drawn into intermediate films with different thicknesses. Therefore, stacking pieces from various sections of the first drawn film will result in a second preform with cyclic variations of layers and varying periodicity of cycles across the preform thickness. This second preform, when drawn down to a film, will include cyclic variations with varying periodicities. If the varying property in layers is the optical refractive index, final films made this way are rugate filters with periodic variation of refractive index across the film thickness, and varying periodicities that allow for fine tuning of reflection bandwidth and band center in their optical reflection spectrum.

This method of multi-layer film manufacturing with either one-step drawing or stack-and-draw process may be used for adjusting the effective refractive index of film material by combining layers or features of at least two materials with different refractive indices with final dimensions considerably smaller than light (electromagnetic) wavelength of interest for specific applications.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method of drawing a material into sheet form, the method comprising the steps of:
providing a preform comprising a plurality of materials as a large aspect ratio block wherein a first transverse dimension of the preform is greater than a second transverse dimension that is approximately perpendicular to the first transverse dimension;
providing a furnace having at least one heating element on at least one side of the furnace;
energizing the at least one heating element to apply heat to the preform to create a thermal gradient from an exterior surface of the preform along the first transverse dimension of the preform inward toward a plane of the preform, wherein the at least one heating element creates a more uniform temperature distribution along the first transverse dimension than the thermal gradient created along the second transverse dimension;
feeding the preform into the furnace in a feeding direction that is perpendicular to the first transverse dimension and the second transverse dimension; and
drawing the preform along the feeding direction in such a manner that the preform deforms less across the first transverse dimension than across the second transverse dimension of the preform,
wherein the step of providing the preform includes providing a first block comprising a first material and embedding in the first block a plurality of parallel aligned secondary material elements, wherein the first material continuously surrounds each of the parallel aligned secondary material elements and the parallel aligned secondary material elements are separated from each other by horizontal or vertical spacing filled with the first material,
wherein, upon completion of the drawing step, the preform is drawn into a sheet form comprising layers corresponding to the first material and the plurality of parallel aligned secondary material elements.

2. The method of claim 1, wherein the plurality of materials comprises at least one of a thermoplastic polymer, a glass, an amorphous material that can be stretched when heated, and metal.

3. The method of claim 1, wherein the preform comprises two or more materials with similar thermal and mechanical properties.

4. The method of claim 1, wherein the step of providing the preform comprises providing the first block comprising the first material and embedding in the first block a second block of a second material; wherein, upon completion of the drawing step, the sheet form comprises layers corresponding to the first and second materials.

5. The method of claim 1, wherein the step of providing the preform comprises providing the first block comprising the first material and embedding in the first block parallel layers of different materials or identical materials with different dopants; wherein, upon completion of the drawing step, the sheet form comprises layers corresponding to the first material and the different materials or identical materials with different dopants.

6. The method of claim 1, wherein the step of providing the preform comprises vertically aligning the secondary material elements centered on a vertical axis of the preform.

7. The method of claim 1, wherein the first transverse dimension of the preform is at least five times greater than the second transverse dimension.

8. The method of claim 1, wherein the first transverse dimension of the preform is at least ten times greater than the second transverse dimension.

9. The method of claim 1, wherein the step of providing the furnace comprises providing a plurality of heating elements to create the temperature gradient such that one side of the preform across the first transverse dimension in one direction is hotter than an opposite side of the preform to cause asymmetric drawing.

10. The method of claim 1, wherein the first transverse dimension of the preform is at least one thousand times greater than the second transverse dimension.

* * * * *